United States Patent Office 2,933,358
Patented Apr. 19, 1960

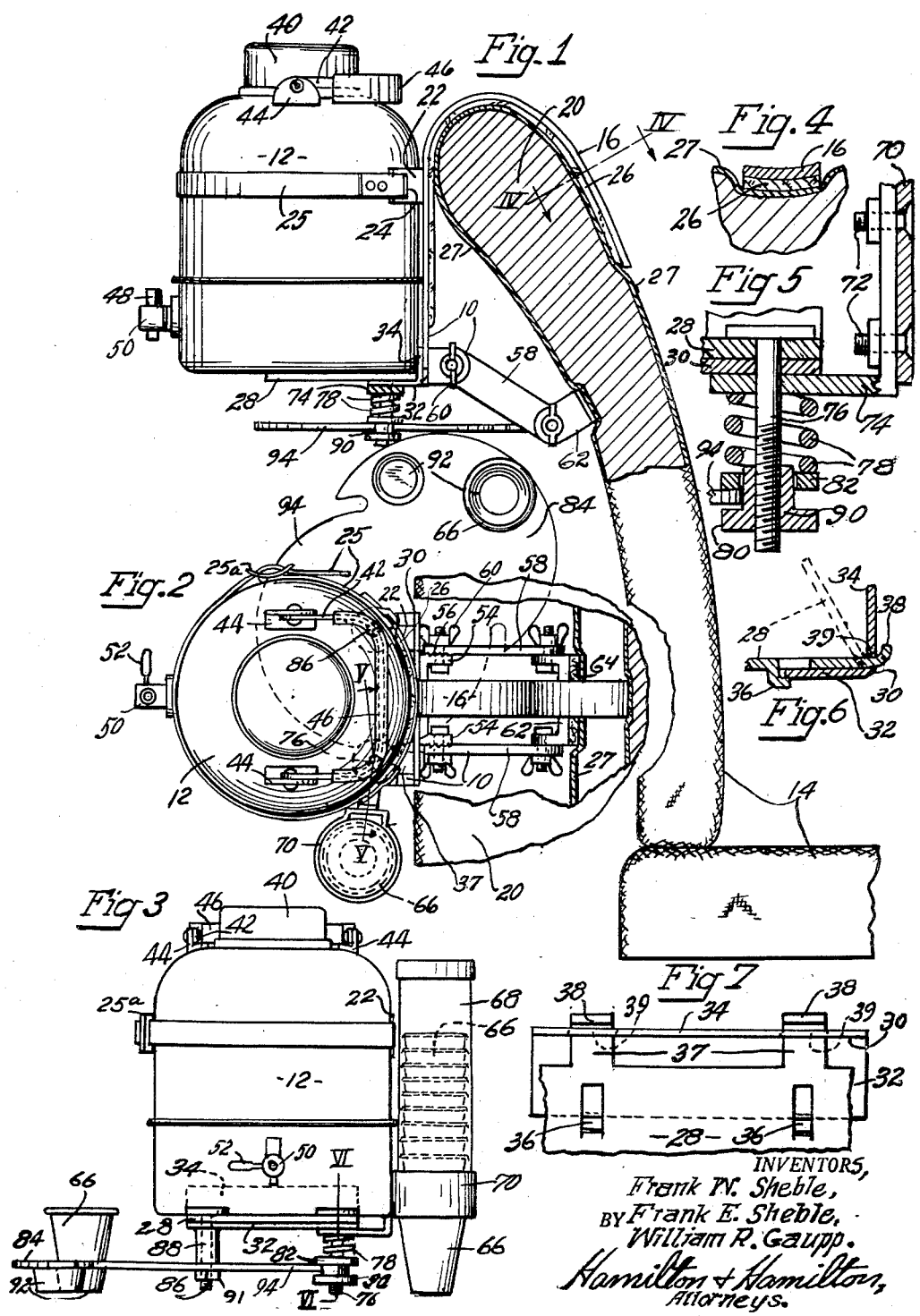

2,933,358

WATER BOTTLE SUPPORT FOR AUTOMOBILE

Frank W. Sheble, Frank E. Sheble, and William R. Gaupp, Kansas City, Kans.

Application September 7, 1955, Serial No. 532,909

3 Claims. (Cl. 311—21)

This invention relates to improvements in a water bottle support for an automobile whereby a water bottle is carried on the back of the front seat of a vehicle without interference with the vehicle occupants of the back seat.

Broadly it is an object of this invention to provide a carriage means for a water bottle and accessories whereby the occupants of the vehicle may have a supply of water which is readily accessible to occupants of said vehicle. A further object of the invention is the provision of a water bottle support that is so arranged that it will not interfere with the vehicle occupants in their use of the vehicle seats when the water bottle is or is not being used.

Other objects are simplicity and economy of construction, convenience and efficiency of operation, and adaptability for use to carry a water bottle having various types of dispensing means and being of various sizes.

With these objects in view as well as other objects which will appear during the course of the specification, reference will be had to the drawing wherein:

Fig. 1 is a side elevational view of the invention with parts omitted and with parts broken away, Fig. 2 is a plan view of the invention with parts broken away and parts shown in dotted lines, Fig. 3 is a vertical rear view of the invention as shown in Figs. 1 and 2, Fig. 4 is an enlarged fragmentary view taken on line IV—IV of Fig. 1, Fig. 5 is an enlarged sectional view taken on line V—V of Fig. 2, with parts omitted, Fig. 6 is an enlarged sectional view taken on line VI—VI o f Fig. 3 with parts broken away, and Fig. 7 is detached plan view of the parts shown in Fig. 5.

Throughout the several views like numerals refer to similar parts and the numeral 10 designates a supporting means for carrying a water bottle 12 on the back of the front seat of a vehicle such as an automobile. This supporting means includes a hook 16 which is made of resilient metal material and which carries a platform 28 which is normally supported at substantially right-angled relation to the seat back 20 over which said hook is engaged. Rigidly secured to the rear side of hook 16 is transversely curved cross-member 22 riveted at its central portion to back member 16 to conform to the curvature of the water bottle 12 and provided at its opposite ends with strap receiving holes 24. The straps 25 at their outer end portions are provided with strap securing means at 25a whereby said straps may be extended about the water bottle 12 to secure the upper end portion thereof slightly above the top of seat back 20 and with the water dispensing means of bottle 12 positioned above the forwardly extending legs of the occupants of the back seat.

Hook member 16 and cross member 22 are provided on their inner surfaces with a covering of soft material 26 such as felt or rubber to protect the seat fabric 27 against wear. A transversely disposed angled member 30 having a horizontal leg 32 and a vertical leg 34 is rigidly fixed to the lower extremity of member 16. To facilitate convenient packing, platform 28 is removably secured to angle member 30 by simple means including a plurality of forwardly projecting tongues 37 having upturned end portions 38 adapted to be moved into openings 39 formed through vertical leg 34. Platform 28 is provided with offset tongues 36 which when the platform is dropped to the horizontal position may be positioned beneath leg 32 of the angled member 30 to secure the platform from accidentally moving upwardly while tongue end portions 38 will engage the front side of vertical leg 34 to prevent sufficient rearward movement of tongue 36 to release from leg 32. These parts are loosely joined together to permit the above described positioning of the parts.

Water bottle 12 has a removable cap 40. An adjustable handle 42 is pivotally attached to ears 44 secured to the bottle and a rubber tube 46 is slipped over the hand engaging portion of the handle. A drain spigot 48 is positioned to drain the bottle and has a body portion 50 and an operating arm 52 by means of which water may be caused to drain from the bottle as needed. Means for adjustably supporting the platform 28 in a horizontal position comprises the angle member 30 to which is secured forwardly turned ears 54 having a series of radially disposed tongues and grooves 56, and side arms 58 provided with corresponding radial tongues and grooves which are adjustable to fit in tongues and grooves 56 whereby when thumb nut 60 is tightened on its bolt, side arms 58 may be disposed at the desired angle to back member 20. Pivotally mounted on the forward end portions of side arms 58, is a cross member 62 covered at its forward surface with a pad 64 which serves to contact the seat covering 27 as shown in Fig. 1. With this structure the bottle support may be fitted to any of the various shaped seat backs to fit any of the present automobiles.

A series of stacked cups 66 is positioned in sealed transparent container 68 which is carried by angle iron 30 for convenience at the right side of the water bottle 12. This container 68 has a base 70 attached by bolts 72 to angled arm 74, see Fig. 5. It will be noted that arm 74 is pivotally mounted on bolt 76 which is secured to platform 28 and angle 30 by means of a nut 80 tensioned by spring 78. Mounted for free sliding movement on nut 80 is a washer 82 which will be further referred to in relation to an adjustable tray adapted to be positioned on the left side of the water bottle.

Tray 84 is carried for rotation on bolt 86 carried by angle iron member 30 which is provided with a fixed depending post 88. Nut 91 serves to hold the tray in position on bolt 86. Tray 84 has a series of cup receiving depressions 92 whereby cups 66 are secured in position on said tray. Integral with tray 84 and in planar relation thereto is an arcuate extension 94 pivoted on bolt 86 and extended to travel above nut flange 80 and below washer 82 to exert an upward pressure against spring 78 whereby said spring is compressed. Due to the construction of these parts 94 is frictionally loaded to maintain its fixed relation to washer 82. Nut 80 thus serves as a tray supporting member giving vertical support to said tray at a point spaced apart from the pivotal axis thereof. Referring to Fig. 2 it will be noted that the arcuate curvature of extension 94 extends at its extremities within the general confines of tray 84, thereby forming stops which engage nut 90 to limit the pivotal movement of the tray.

Referring to Fig. 1 it will be noted that the adjustable parts are all positioned well above the seat level of the vehicle for plenty of leg room.

What we claim as new and desire to protect by Letters Patent is:

1. In combination with a support adapted to be mounted on the rear side of a vehicle seat back, a substantially planar tray carried horizontally by said support for pivotal movement about a vertical axis, said tray having a portion of the edge thereof formed concentrically with the axis thereof, and a tray supporting member carried by said support in spaced relation to the axis of said tray and having sliding engagement with said concentric tray edge portion, whereby said tray is supported in its horizontal position as it is pivoted about its axis.

2. The structure as recited in claim 1 wherein said tray has portions at the ends of the concentric edge portion thereof which extend relatively outwardly from said concentric edge portion whereby to form stops operable to engage said tray supporting member to limit the pivotal movement of said tray.

3. The structure as recited in claim 1 wherein said tray supporting member is provided with means frictionally engaging the concentric edge portion of said tray whereby to secure said tray yieldably against pivotal movement.

References Cited in the file of this patent

UNITED STATES PATENTS

| | | |
|---|---|---|
| 219,399 | Henkel | Sept. 4, 1879 |
| 271,509 | Nolton | Jan. 30, 1883 |
| 1,184,424 | Cooley | May 23, 1916 |
| 1,352,914 | Plasclascovitie | Sept. 14, 1920 |
| 1,671,293 | Jennens | May 29, 1928 |
| 2,217,992 | Pyle | Oct. 15, 1940 |
| 2,526,322 | Black | Oct. 17, 1950 |
| 2,680,523 | Heeter | June 8, 1954 |